United States Patent [19]
Wycoff et al.

[11] Patent Number: 5,157,405
[45] Date of Patent: Oct. 20, 1992

[54] HUNTING ARROW TRACKING SYSTEM

[75] Inventors: Keith H. Wycoff, 1205 N. Tyler St., Lexington, Nebr. 68850; Roy L. Holmes, Overton, Nebr.

[73] Assignee: Keith H. Wycoff, Lexington, Nebr.

[21] Appl. No.: 786,844

[22] Filed: Nov. 1, 1991

[51] Int. Cl.[5] .............................................. G01S 1/08
[52] U.S. Cl. .................................... 342/386; 273/416
[58] Field of Search ....................... 342/386, 419, 385; 102/216; 273/416, 213

[56] References Cited

U.S. PATENT DOCUMENTS

| | | | |
|---|---|---|---|
| 3,740,648 | 6/1973 | Grotjahn. | |
| 3,790,948 | 2/1974 | Ratkovich. | |
| 4,421,319 | 12/1983 | Murphy. | |
| 4,704,612 | 11/1987 | Boy et al. | |
| 4,749,198 | 2/1987 | Brailean. | |
| 4,885,800 | 12/1989 | Ragle. | |
| 4,940,245 | 7/1990 | Bittle, Jr. | 273/416 |

Primary Examiner—Theodore M. Blum
Attorney, Agent, or Firm—Emrich & Dithmar

[57] ABSTRACT

A hunting arrow tracking system includes a tubular housing removably connectable to an arrow shaft and enclosing a battery-powered transmitter. The batteries are disposed in a container in the housing which is spring biased against a piezoceramic transducer which generates a trigger signal in response to longitudinal acceleration or deceleration of the arrow to set a latch for connecting the battery to the transmitter, thereby causing it to transmit a low duty cycle pulsed signal. The transmitter is connected to a strip antenna which extends the length of the arrow shaft and is adhesively secured to the outer surface thereof. A directional receiver receives the transmitted signal and indicates the direction from which it is being received. The latch can be reset by passing a magnet over the arrow to activate a reed switch.

20 Claims, 4 Drawing Sheets

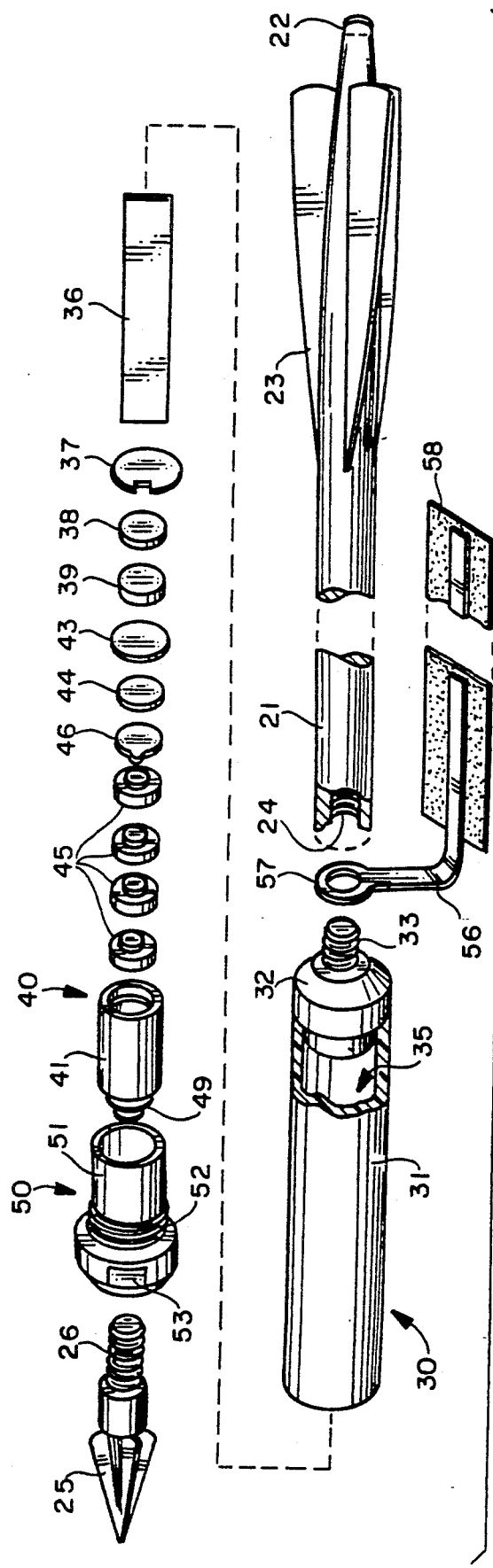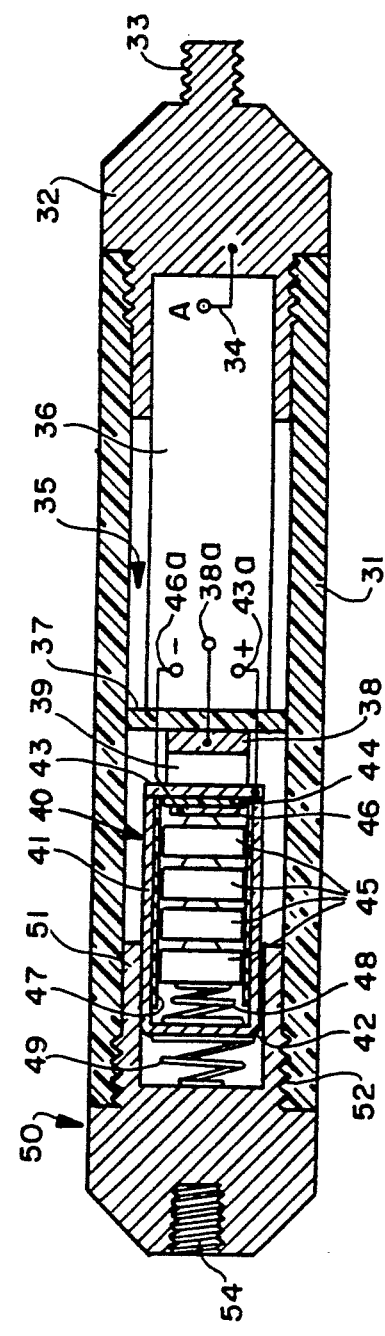

HUNTING ARROW TRACKING SYSTEM

BACKGROUND OF THE INVENTION

1. Field of the Invention

This invention relates generally to a hunting arrow and, more particularly, to a system for tracking a hunting arrow and/or a game animal shot thereby, by means of radio signals emanating therefrom.

2. Description of the Prior Art

In the hunting of animal game with a bow and arrows, it is often difficult to locate a hunting arrow after it is shot from the bow. This may be either because it has missed the target and landed in an area of dense foliage or the like, or has become embedded in the target animal without killing it, the animal then fleeing the area. In order to assist in locating such hunting arrows there have been provided radio locating systems, whereby a radio transmitter carried by the arrow emits signals which can be detected by a directional receiver carried by the hunter.

Some such prior systems have utilized specially-designed customized arrows with built-in transmitters and/or antennas therefor, such customized arrows being disclosed, for example, in U.S. Pat. Nos. 4,704,612 and 3,790,948. Such tracking systems are expensive, since they require the hunter to purchase the specialized custom arrows.

U.S. Pat. No. 4,704,612 also discloses the concept of utilizing the metal shaft of an arrow as a transmitter antenna, but this requires the use of metal arrows.

U.S. Pat. No. 4,885,800 discloses a transmitter which is removably mountable on a standard arrow, but makes no provision for a transmitter antenna.

Of necessity, the batteries used to power an arrow-mounted transmitter must be very small, thereby inherently limiting the amount of power available, and restricting battery life. It is known to provide inertia-activated means for connecting the battery to the transmitter only in response to impact of the arrow, so that the transmitter is not operated until it is needed. But such systems have utilized switch means for mechanically connecting and disconnecting the battery from the transmitter, with attendant reliability problems.

U.S. Pat. No. 4,704,612 also discloses the use of a pulsed transmitter output signal, which further serves to reduce battery consumption. However, prior systems have not effectively tailored the output signal of the transmitter to minimize power consumption, while at the same time maximizing the strength of the transmitted signals to insure an adequate reception range.

SUMMARY OF THE INVENTION

It is a general object of the present invention to provide an improved trackable hunting arrow and tracking system therefor which avoid the disadvantages of prior systems while affording additional structural and operating advantages.

An important feature of the invention is the provision of a radio tracking system for hunting arrows which is usable with standard hunting arrows made of any material.

In connection with the foregoing feature, another feature of the invention is the provision of a trackable hunting arrow with a transmitter antenna of simple and inexpensive construction which can be easily mounted on the outside of the arrow.

Another feature of the invention is the provision of a trackable hunting arrow with a transducer-activated radio transmitter.

Another feature of the invention is the provision of a hunting arrow tracking system which utilizes a unique transmitted signal to minimize power consumption while maximizing output signal strength.

Certain ones of these features of the invention are attained by providing a trackable hunting arrow comprising: a shaft, radio transmitter means carried by the shaft, antenna means including an elongated electrically conductive strip connected at one end thereof to the transmitter means and extending longitudinally of the shaft, and means securing the strip along the outside of the shaft.

Other features of the invention are attained by providing a trackable hunting arrow comprising: a shaft, means on the shaft defining a hollow chamber, radio transmitter means disposed in the chamber, battery means disposed in the chamber, electronic switch means disposed in the chamber and coupled to the battery means and to the transmitter means, the switch means being operable between a first condition disconnecting the transmitter means from the battery means and a second condition connecting the transmitter means to the battery means, and transducer means coupled to the switch means and responsive to a predetermined dynamic force longitudinally of the shaft for generating a trigger signal, the switch means being responsive to the trigger signal for switching from the first condition to the second condition thereof.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there are illustrated in the accompanying drawings preferred embodiments thereof, from an inspection of which, when considered in connection with the following description, the invention, its construction and operation, and many of its advantages should be readily understood and appreciated.

FIG. 2 is an enlarged, exploded perspective view of a trackable hunting arrow of the system of FIG. 1;

FIG. 6 is a further enlarged, fragmentary, sectional view of the radio transmitter of the arrow of FIG. 2;

DESCRIPTION OF THE PREFERRED EMBODIMENT

Figure 1:
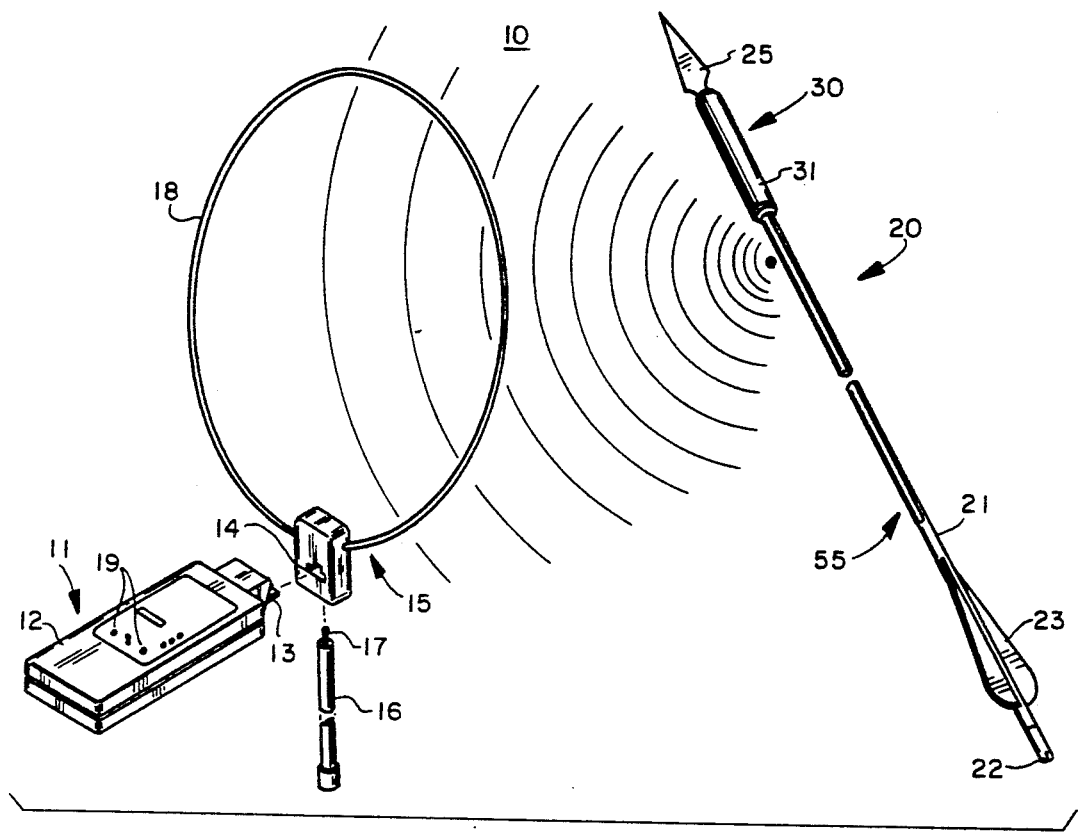
FIG. 1 is a perspective view of a hunting arrow tracking system constructed in accordance with and embodying the features of the present invention.

Referring to FIG. 1, there is illustrated a tracking system, generally designated by the numeral 10, constructed in accordance with the present invention. The system 10 includes a receiver 11 having a directional antenna assembly 15 and a hunting arrow 20 having a detachable transmitter assembly 30 and an antenna assembly 55. The receiver 11 has a housing 12 which carries a plug connector 13 adapted to be plugged into a mating receptacle in a receptacle block 14 of the directional antenna assembly 15, whereby the directional antenna assembly 15 is detachably mounted on the receiver 11. The directional antenna assembly 15 includes a helical antenna 16 provided with a threaded stud 17 adapted to be threaded into the receptacle block 14, and a loop antenna 18 connected to the receptacle block 14. The receiver 11 is provided with an LED display including directional LED's 19 to indicate the direction (left or right of center) from which a received signal is being received. The receiver 11 may be a standard pulse receiver adapted to receive a pulsating signal with a short duty cycle.

Referring also to FIG. 2, the hunting arrow 20 is preferably a standard arrow having an elongated shaft 21 provided at the rear end thereof with a nock 22 and fletching 23. The shaft 21 is provided at its forward end with an internally-threaded socket 24. The shaft 21 may be formed of any suitable material, such as metal, wood, plastic, fiberglass or the like. The arrow 20 includes an arrowhead 25 provided with an externally threaded stud 26 adapted to be threadedly engaged in the socket 24 of the shaft 21 in a known manner so as to afford interchangeability of arrowheads.

Referring now also to FIG. 6, the transmitter assembly 30 includes a tubular housing 31, preferably formed of plastic, and closed at its rearward end by a metallic end piece 32 provided with an externally threaded stud 33 adapted to be threadedly engaged in the socket 24 of the arrow shaft 21. The housing 31 defines a hollow chamber 35, in the rear end of which is mounted a printed circuit ("PC") board 36 carrying radio transmitter circuitry 60, which will be described more fully below in connection with FIG. 7. The end piece 32 is connected to the PC board 36 by a suitable conductor 34. The chamber 35 is divided by a transverse partition 37 disposed just forwardly of the PC board 36 and preferably formed of an electrically insulating material. Secured to the front side of the partition 37 is a transducer contact 38 which is connected to the PC board 36 by a conductor 38a which extends through a notch in the partition 37. Secured to the front side of the contact 38 and electrically connected thereto is a piezoceramic transducer 39 which generates an electrical output signal in response to changes in the pressure applied thereto, in a known manner.

Disposed in the chamber 35, forwardly of the transducer 39, is a cylindrical container 40 formed of an electrically conductive material and having a cylindrical side wall 41 closed at the forward end thereof by an integral front end wall 42. The rear end of the container 40 is closed by a removable rear end wall 43, to the front surface of which is attached a circular insulator 44 dimensioned to fit just inside the rear end of the cylindrical side wall 41 when the rear wall 43 is disposed in abutting relationship therewith. The container 40 is electrically connected to the PC board 36 by a suitable conductor 43a. Disposed within the container 40 are a plurality of button-type batteries 45 arranged in series, with the negative terminal of the rearmost battery 45 being disposed in engagement with a negative contact 46 which is mounted on the insulator 44 and is connected by a suitable conductor 46a to the PC board 36. Mounted on the inner surface of the cylindrical side wall 41 in surrounding relationship with the batteries 45 is a cylindrical, electrically insulating sleeve 47. A helical spring contact 48 is disposed between the forwardmost battery 45 and the front end wall 42 of the container 40 to provide electrical contact therebetween and to resiliently urge the batteries 45 against the negative contact 46.

In use, the rear wall 43 of the container 40 is disposed in engagement with the front surface of the transducer 39, being resiliently urged thereagainst by a helical compression spring 49 disposed along the outer surface of the front end wall 42 of the container 40. The bias spring 49 bears against an arrowhead adapter 50 which is received in the front end of the tubular housing 31. More specifically, the adapter 50 has a hollow cylindrical portion which extends from the rear end thereof and fits telescopically inside the front end of the tubular housing 31 being threadedly engaged therewith, as at 52. The adapter 50 is provided with flats 53 to facilitate such threaded engagement. The spring 49 and the forward end of the container 40 are received within the cylindrical portion 51 for centering the container 40 within the cavity 35. The front end of the adapter 50 has an internally threaded axial bore 54 therein adapted to threadedly receive therein the stud 26 of the arrowhead 25. The parts are so dimensioned and arranged that, when assembled as illustrated in FIG. 6, the bias spring 49 urges the container 40 against the transducer 39 with a predetermined force to exert a predetermined pressure thereon.

Figure 3:
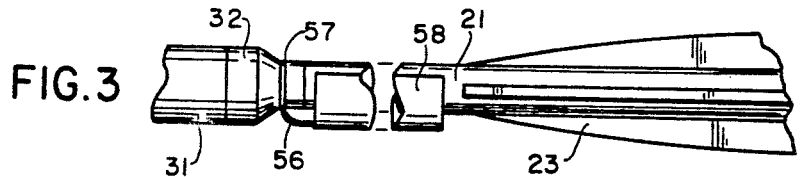
FIG. 3 is a fragmentary side elevational view of the arrow of FIG. 2, illustrating the transmitter antenna.
Figure 4:
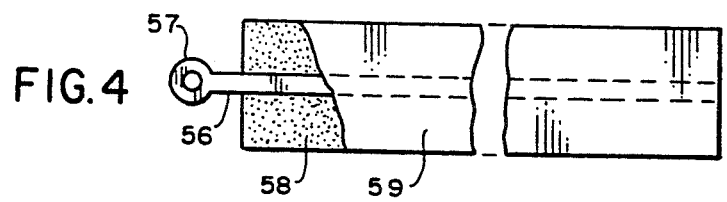
FIG. 4 is a fragmentary front elevational view of the transmitter antenna of FIG. 3.
Figure 5:
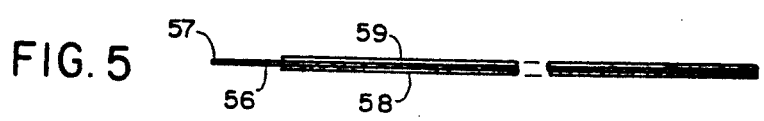
FIG. 5 is a side elevational view of the transmitter antenna of FIG. 4.

Referring also to FIGS. 3-5, the antenna assembly 55 includes an elongated, thin, flat and flexible strip 56 of electrically conductive material provided at one end thereof with a loop 57. Fixedly secured to the conductive strip 56 along one side thereof is an elongated attachment strip 58 which is substantially wider than the strip 56 and extends substantially the entire length thereof and is formed of a suitable flexible sheet material. The side of the strip 58 facing the strip 56 is preferably coated with a pressure-sensitive adhesive material for adhesively securing the strip 56 thereto centrally thereof. The remaining adhesively coated surface of the strip 58 and the exposed surface of the conductive strip 56 may be covered by a suitable release liner 59, which is peeled off preparatory to application of the antenna assembly 55.

In use, the loop 57 receives therethrough the stud 33 and is trapped firmly against the metal end piece 32 when the stud 33 is engaged in the socket 24 of the arrow shaft 21, thus establishing electrical contact between the conductive strip 56 and the circuitry on the PC board 36. The release liner 59 is then peeled off and the strips 56 and 58 are bent and extended rearwardly along the shaft 21 and adhesively secured to the outer surface thereof, as illustrated in FIGS. 2 and 3. The antenna assembly 55 is so oriented on the shaft 21 that it will not contact the bow when the arrow is shot. Thus, it will be appreciated that the conductive strip 56 provides a fixed-length antenna for the transmitter assembly 30.

Figure 7:
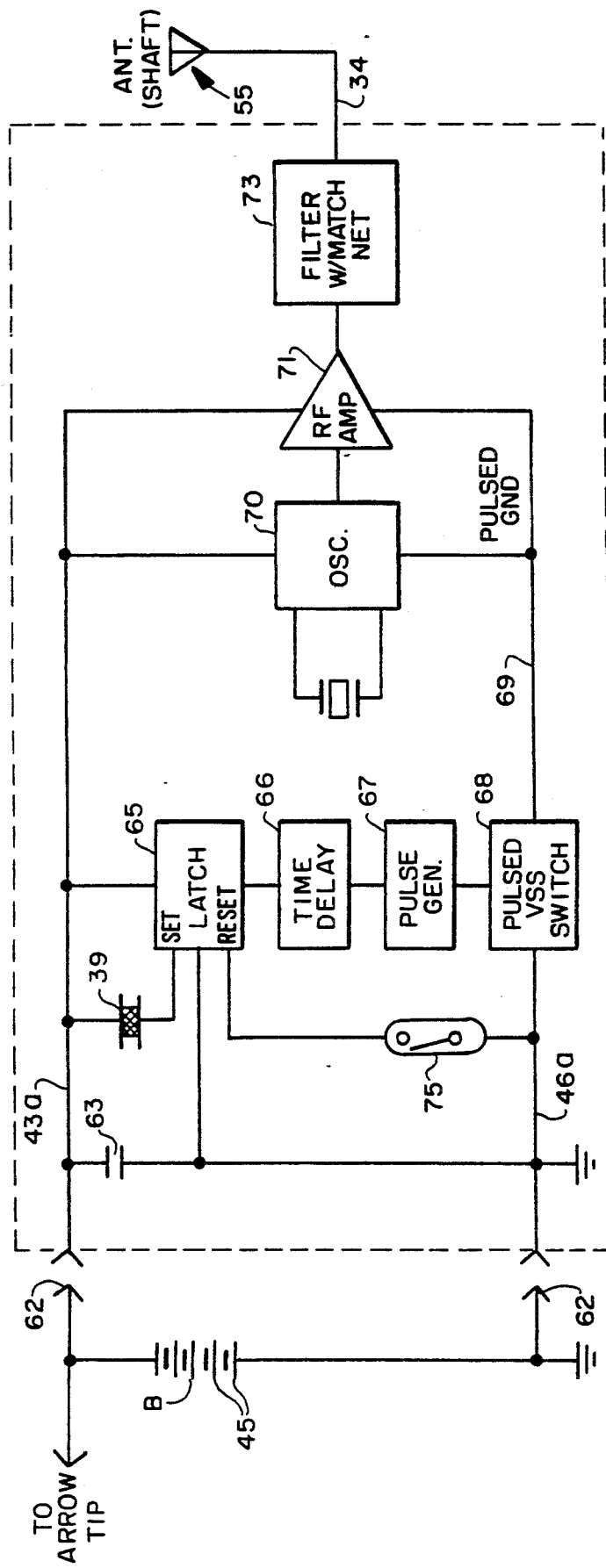
FIG. 7 is a partially block and partially schematic circuit diagram of the transmitter of the arrow of FIG. 2.

Referring to FIG. 7, the transmitter circuit 60 is illustrated. The terminals of the battery cells 45 are, respectively, connected to the conductors 43a and 46a, the latter being grounded, the removability of the battery cells 45 being indicated by the jack designations 62. A capacitor 63 is connected in parallel with the batteries 45. The positive terminal of the batteries 45 is also connected to the input terminal of an electronic latch circuit 65, the output terminal of which is connected through a time delay circuit 66 to the input of a pulse generator circuit 67. The transducer 39 is connected between the conductor 43a and the set terminal of the latch 65. The negative terminal of the latch 65 is connected to the ground conductor 46a. The output of the pulse generator circuit 67 is connected to a control input of a pulsed VSS switch 68 which has its input connected to the negative terminal of the batteries 45 and its output connected to a conductor 69. A crystal-controlled oscillator 70 is connected across the conductors 43a and 69 and has its output connected to the input of an RF amplifier 71, which has its supply terminals respectively connected to the conductors 43a and 69. The output of the amplifier 71 is applied through a filter/matching network 73 and the conductor 34 to the antenna assembly 55 via the metal end piece 32 (FIGS. 2 and 6). A normally-open reed switch 75 is connected between the negative terminal of the batteries 45 and the reset terminal of the latch circuit 65.

In use, when the arrow 20 is at rest, the transducer 39 is compressed with a predetermined pressure by the action of the bias spring 49 and the batteries 45 are maintained in electrical connection with the conductors 43a and 46a to supply power to the latch circuit 65. However, until the latch circuit 65 is set, the transmitter circuit 60 draws a near zero current. When the arrow 20 strikes an object after being shot, the springs 48 and 49 are compressed upon impact, thereby causing the batteries 45 to move momentarily away from the negative contact 46, disconnecting them from the conductor 43a. However, during this momentary disconnection, the capacitor 63 continues to supply power to the latch circuit 65. The container 40 also momentarily moves away from the transducer 39, decompressing it and causing it to generate an output voltage. After impact, the springs 48 and 49 recoil, reconnecting the batteries 45 to the contact 46 and compressing the transducer 39, causing it to generate another voltage of an opposite polarity to the voltage which was output upon decompression of the transducer 39. It will be appreciated that the transducer 39 and the latch circuit 65 may be configured so that the latch circuit 65 is set by either the compression voltage or the decompression voltage from the transducer 39. In the former case, it will be appreciated that the latch circuit 65 may also be set by the compression of the transducer 39 as the result of the initial acceleration of the arrow 20 when it is shot.

Figure 8:
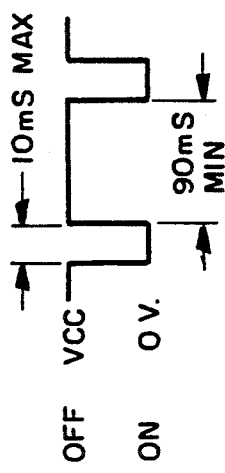
FIG. 8 is a waveform diagram of the output signal from the transmitter circuit of FIG. 7.

When the latch circuit 65 is set it generates a output signal activating the time delay circuit 66. After the delay period, the time delay circuit 66 outputs a signal to activate the pulse generator circuit 67 which, in turn, controls the pulsed switch 68. More specifically, referring to FIG. 8, the output of the pulse generator circuit 67 is illustrated as a pulsating signal which varies between the battery voltage VCC and zero volts, the switch 68 being in an OFF condition when the pulse output voltage is VCC and being in an ON condition when the pulse output voltage is zero volts. When the switch 68 is in its ON condition the oscillator 70 is connected across the batteries 45 to generate an output signal which is amplified by the amplifier 71 and then transmitted through the filter/matching network 73 and the antenna assembly 55 to the receiver 11. The LED directional displays 19 of the receiver 11 will indicate the direction from which the received signal is coming. It will be appreciated that the time delay circuit 66, which has a delay period greater than the time of momentary disconnection of the batteries 45 upon impact of the arrow 20, prevents the pulse generator 67 from being activated until the batteries 45 have been reconnected upon recoil of the springs 48 and 49. Thus, the full power of the batteries 45 will be available to power the oscillator 70 when the switch 68 is switched to its ON condition. Otherwise, the high current consuming oscillator 70 and RF amplifier 72 would be immediately connected and would rapidly discharge the storage capacitor 63, thereby allowing the latch 65 to reset before reconnection of the battery 45.

The FCC allows the transmitter output field strength to be averaged over a maximum period of 100 ms. Further, a 100 ms pulse train can be averaged up to a ratio of 90% off to 10% on. This, then, allows a peak power increase of 20 db, (10:1 field strength ratio maximum). The transmitter 60 is preferably designed to transmit a single pulse during the 100 ms averaging period. Thus, for maximum strength of the output pulse, the ON time of the switch 68 must be no more than 10 ms per pulse period, the OFF time then being no less than 90 ms. to establish a maximum 10% duty cycle. However, the smaller the duty cycle, the less battery power is consumed. Thus, in the preferred embodiment, the pulse generator circuit 67 is preferably designed to produce an OFF/ON ratio of approximately 30:1 or 40:1. This provides a shorter pulse at the receiver, which must be designed to efficiently detect the shorter pulse without adversely affecting range.

It will be appreciated that the latch circuit 65 will continue to be activated until it is reset or until the batteries 45 ar exhausted. The latch circuit 65 can be reset by passing a magnet in close proximity to the reed switch 75, thereby closing it to reset the latch circuit 65, to prevent unnecessary consumption of battery power.

Figure 9:
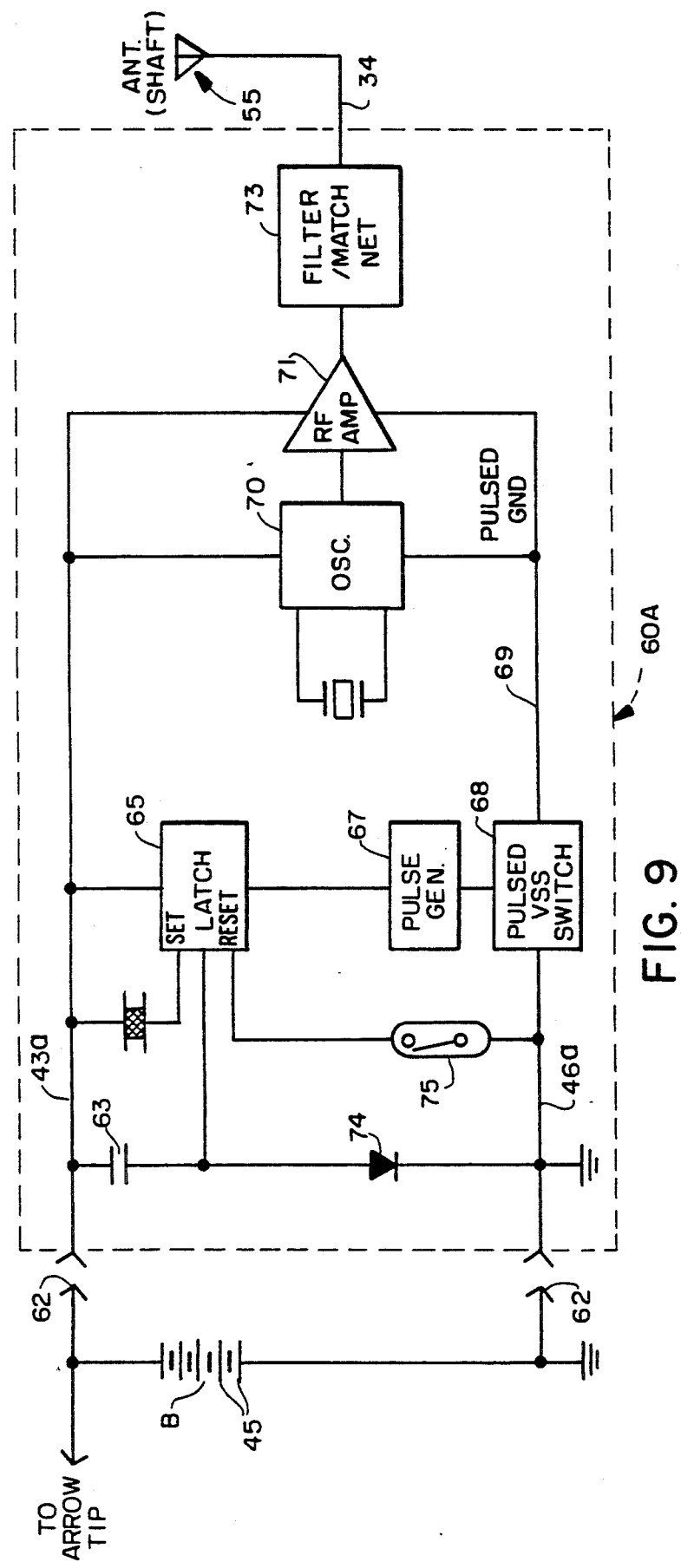
FIG. 9 is a circuit diagram, similar to FIG. 7, showing a modified form of the transmitter of FIG. 7.

With the transmitter circuit of FIG. 7, it is possible that longitudinal shocks subsequent to the impact of the arrow, such as shocks caused by movement of the game in which the arrow has been embedded, may cause the battery 45 to again become disconnected, in which case the oscillator 70 and the RF amplifier 71 would rapidly discharge the capacitor 63, allowing the latch 65 to reset, thereby terminating transmissions prematurely. Referring to FIG. 9, there is illustrated an alternative transmitter circuit 60A which overcomes this drawback. The circuit of FIG. 9 is substantially the same as that of FIG. 7, with the exception that a diode 74 is connected in series with the capacitor 63, such that the cathode of the diode 74 is connected to the ground conductor 46a and the anode thereof is connected to the negative terminal of the latch 65. Furthermore, the time delay circuit 66 is eliminated and the output of the latch 65 is connected directly to the input of the pulse generator 67. In operation the diode 74 is forward biased and, therefore, charges the capacitor 63 whenever the batteries 45 are connected through the contacts 62. When the batteries 45 are disconnected, whether on initial impact of the arrow or as a result of subsequent mechanical shocks, the diode 74 is reverse biased, so that the storage capacitor 63 supplies current to the latch 65, thereby keeping it set.

From the foregoing, it can be seen that there has been provided an improved arrow tracking system which has a transmitter removably mounted on a standard arrow and an antenna assembly usable with any material arrow, the transmitter circuit being designed for optimum balance between output signal strength and battery consumption and being characterized by reliability of activation.

We claim:

1. A trackable hunting arrow comprising: a shaft having an outer surface, radio transmitter means carried by said shaft, antenna means including an elongated electrically conductive strip connected at one end thereof to said transmitter means and extending longitudinally of said shaft substantially parallel thereto, and means securing said strip along said outer surface of said shaft.

2. The arrow of claim 1, wherein said conductive strip is substantially flat.

3. The arrow of claim 2, wherein said means securing includes an attachment strip wider than said conductive strip extending the length thereof and integral therewith.

4. The arrow of claim 3, wherein said means securing includes adhesive means for adhesively securing said attachment strip along the outside of said shaft.

5. The arrow of claim 1, and further comprising a tubular housing carrying said transmitter means and provided with a mounting stud engageable with said shaft at one end thereof, said antenna means including a loop at one end thereof receiving therethrough said stud in its engaged condition for connecting said antenna means to said transmitter means.

6. A trackable hunting arrow comprising: a shaft, means carried by said shaft and discrete therefrom and defining a hollow chamber, radio transmitter means disposed in said chamber, battery means disposed in said chamber, electronic switch means disposed in said chamber and coupled to said battery means and to said transmitter means, said switch means being operable between a first condition disconnecting said transmitter means from said battery means and a second condition connecting said transmitter means to said battery means, and transducer means coupled to said switch means and responsive to a predetermined dynamic force longitudinally of said shaft for generating a trigger signal, said switch means being responsive to said trigger signal for switching from said first condition to said second condition thereof.

7. The arrow of claim 6, wherein said means defining a hollow chamber includes means for removably connecting it to said shaft.

8. The arrow of claim 6, wherein said transducer means includes a piezoceramic transducer, and resilient means engageable with said transducer for applying pressure thereto in directions longitudinally of said shaft.

9. The arrow of claim 8, wherein said resilient means includes a pressure member engageable with said transducer and a spring resiliently urging said pressure member against said transducer with a pressure which varies in response to longitudinal acceleration or deceleration of the arrow.

10. The arrow of claim 9, wherein said pressure member includes a container in which said battery means is disposed.

11. The arrow of claim 6, wherein said transmitter includes means for generating a pulsating output signal having a period of substantially 100 ms and a duty cycle no greater than 5%.

12. The arrow of claim 6, wherein said switch means includes time delay means for delaying energization of said transmitter means for a predetermined time period after generation of said trigger signal.

13. The arrow of claim 6, and further comprising capacitive storage means coupled to said switch means for maintaining said switch means enabled in the event of a momentary disconnection of said battery means from said switch means.

14. The arrow of claim 13, and further comprising means coupled to said capacitative storage means for preventing energization of said transmitter means when said battery means is disconnected from said switch means.

15. A system for tracking a hunting arrow having a shaft with an outer surface comprising: radio transmitter means carried by the arrow, battery means carried by the arrow, electronic switch means carried by the arrow and coupled to said battery means and to said transmitter means, said switch means being operable between a first condition disconnecting said transmitter means from said battery means and a second condition connecting said transmitter means to said battery means, transducer means coupled to said switch means and responsive to a predetermined dynamic force longitudinally of the shaft for generating a trigger signal, said switch means being responsive to said trigger signal for switching from said first condition to said second condition thereof, antenna means including an elongated electrically conductive strip connected at one end thereof to said transmitter means and extending longitudinally of the shaft, means securing said strip along said outer surface of the shaft, and radio receiver means for receiving radio signals transmitted by said transmitter means.

16. The system of claim 15, wherein said receiver means includes LED display means.

17. The system of claim 16, and further comprising directional antenna means coupled to said receiver means, said display means including means indicating the direction from which a received signal is being received.

18. The system of claim 17, wherein said directional antenna means is removably attachable to said receiver means.

19. The system of claim 15, wherein said electrically conductive strip is substantially flat, said means securing including an attachment strip wider than said conductive strip extending the length thereof and integral therewith, and means adhesively securing said attachment strip along the outside of said shaft.

20. The system of claim 15, wherein said transmitter means includes means for generating a pulsating output signal having a duty cycle no greater than 10%.

* * * * *